United States Patent [19]

Hewitt

[11] 4,270,862

[45] Jun. 2, 1981

[54] MAGNETO-OPTIC LIGHT DEFLECTOR SYSTEM

[75] Inventor: Frederick G. Hewitt, Eagan, Minn.

[73] Assignee: Sperry Corporation, New York, N.Y.

[21] Appl. No.: 7,071

[22] Filed: Jan. 29, 1979

[51] Int. Cl.³ .......................... G01P 3/36; G02B 5/18
[52] U.S. Cl. .................... 356/5; 350/162 R; 356/28; 356/152
[58] Field of Search .................. 356/4, 5, 28, 152; 350/162 R

[56] References Cited

U.S. PATENT DOCUMENTS

| 3,752,563 | 8/1973 | Torok et al. | 350/151 |
| 4,025,194 | 5/1977 | Teppo | 356/5 |

FOREIGN PATENT DOCUMENTS 2805190 10/1978 Fed. Rep. of Germany ............ 356/5

Primary Examiner—Stephen C. Buczinski
Attorney, Agent, or Firm—Kenneth T. Grace; William E. Cleaver; Marshall M. Truex

[57] ABSTRACT

An apparatus for and a method of utilizing a magneto-optic stripe domain light deflector for both the transmitted and received light beam.

7 Claims, 1 Drawing Figure

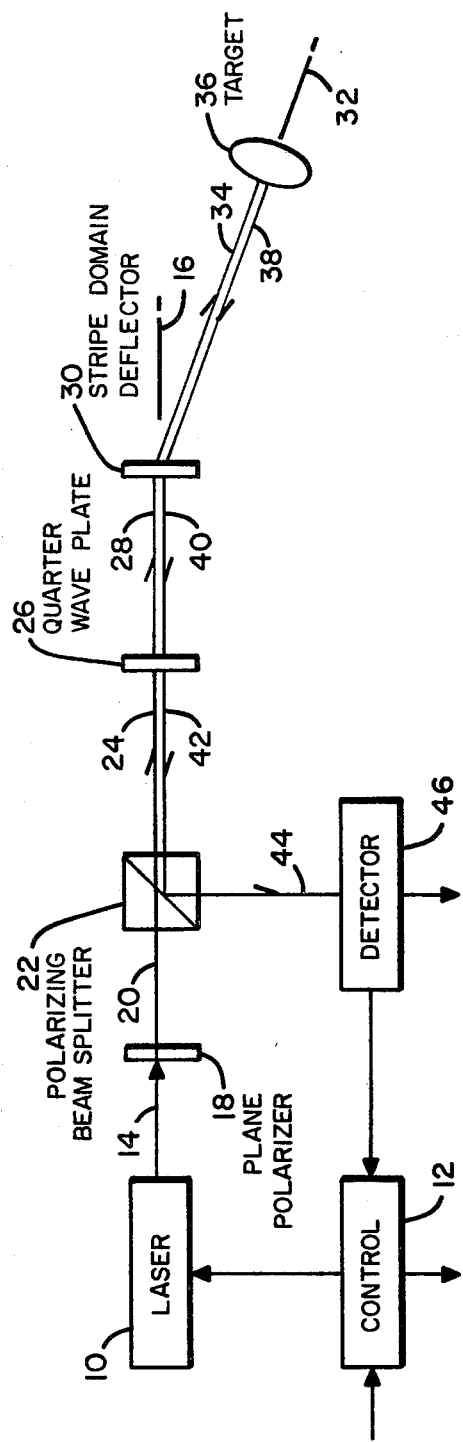

MAGNETO-OPTIC LIGHT DEFLECTOR SYSTEM

The invention described herein was made in the course of, or under, a contract with the Department of the Air Force.

BACKGROUND OF THE INVENTION

In the prior art it is known to use light for the storage of information in a thermoplastic film—see the D. S. Lo, et al, U.S. Pat. No. 3,995,280—or in a magnetic film—see the M. M. Hanson, et al, U.S. Pat. No. 4,040,039; for optically processing information—see the D. L. Fleming U.S. Pat. No. 4,087,809—or for optically correlating information—see the D. L. Fleming, et al, U.S. Pat. No. 4,123,142. In the E. J. Torok, et al, U.S. Pat. No. 3,752,563 there is taught the use of an optical system that includes a diffraction grating for the change of direction of an incident light beam. The diffraction grating includes a thin ferromagnetic film in which a plurality of parallel, straight stripe domains by their separation and orientation control the angle of deflection and the angle of rotation, respectively, of an incident light beam. Such diffraction grating has been used as a uni-directional device—see the G. F. Sauter, et al, patent application filed Dec. 27, 1977, Ser. No. 864,167, now U.S. Pat. No. 4,148,556—or a bi-directional device—see the G. F. Sauter patent application filed Mar. 30, 1978, Ser. No. 891,881, now U.S. Pat. No. 4,168,107—for coupling a light beam to a dielectric waveguide, modulating the intensity of the coupled diffracted light beam and multiplexing the coupled diffracted light beam to any selected one of several optical fiber transmission lines.

SUMMARY OF THE INVENTION

In the present invention a coherent, transmitted light, e.g., laser, beam is linearly polarized by a beam splitter, is circularly polarized and rotated by a quarter wave plane and is then focused upon a target by a magnetic film diffraction grating. The returned light beam, the sense of rotation of which has been reversed when reflected by the target, impinges upon the diffraction grating which, in turn, focuses the returned light beam back upon the quarter wave plate. The quarter wave plate, in turn, reconverts the circularly polarized return light beam back to a linearly polarized return light beam which is rotated 90° with respect to the linearly polarized transmitted light beam. This rotated linearly polarized return light beam is, by the beam splitter, reflected to a detector. The detector generates an output signal: the transmission time of the transmitted-returned light beams is an indication of the distance to the target while the rotation and deflection of the transmitted light beam is an indication of the direction of the target.

BRIEF DESCRIPTION OF THE DRAWINGS

The single FIGURE is an illustration of an optical system incorporating the present invention.

DESCRIPTION OF THE PREFERRED EMBODIMENTS

In the single FIGURE, source 10 is a source of a coherent light beam 14 such as a HeNe laser beam of red light (wave length 0.6328 microns, $\mu$). When activated by control 12 a, e.g., pulse, light beam 14 is directed along optic axis 16, which is normally incident to the plane of plane polarizer 18, which linearly polarizes light beam 14, in, e.g., a vertical plane. The resulting plane polarized light beam 20 is then directed upon beam splitter 22, which may be utilized as a plane polarizing device obviating the need for plane polarizer 18, whose plane of polarization, with respect to the plane of polarization of plane polarizer 18 and light beam 20, is parallel thereto. Accordingly, light beam 20 is transmitted therethrough and as plane polarized light beam 24 is directed normally incident to the plane of quarter wave plate 26. Plane or linear polarizer 18 and quarter wave plate 26 form a circular polarizer—see the Publication, "Linear and Quarter-Wave Polarizers Cancel Reflected Light," Electromechanical Design, November, 1969, Page 14—emitting a circularly polarized light beam 28, the sense of rotation of which is either lefthand or righthand and which is directed normally incident to the plane of deflector 30.

Deflector 30 is preferably a low-loss diffraction grating that is capable of altering the direction of optic axis 16 of light beam 28 to the optic axis 32 of the transmitted light beam 34 along two orthogonal axes—vertically and horizontally. A preferred diffraction grating would be that of the E. J. Torok, et al, U.S. Pat. No. 3,752,563. Such diffraction grating utilizes the stripe domains in a magnetic film as a means for controllably directing the transmitted light beam throughout an optical cone whose major axis is normal to the plane of the diffraction grating or magnetic film.

The transmitted circularly polarized light beam 34 is directed through the air space upon a distant target 36, which may typically be an airplane. Target 36 reflects the transmitted circularly polarized light beam 34, reversing the sense of rotation, generating the reflected circularly polarized light beam 38 which is directed incident to deflector 30. Deflector 30, in a reverse manner as compared to light beams 28, 34, then alters the direction or optic axis of reflected circularly polarized light beam 38 from optic axis 32 directing the reflected circularly polarized light beam 40 back along optic axis 16 and normally incident to the plane of the quarter wave plate 26. Quarter wave plate 26 reconverts the reversely rotated circularly polarized light beam 40 to a plane polarized light beam 42 which has its plane of polarization rotated 90° with respect to plane polarization light beam 24. Plane polarized light beam 42 is reflected by beam splitter 22 as plane polarized light beam 44 and is directed upon detector 46.

Detector 46 detects the significant reflected signal, represented by light beam 44, and couples a detect signal to control 12. Control 12 preferably includes a timing device with determines the transmission-reflection time duration of light beam 34, 38 providing an output signal indicative of the range or distance of the target 36. This range signal when combined with the direction signal generated by deflector 30 provides all the information that is necessary to define the air space location of target 36.

The use of the single deflector 30 for the transmission-reception of the single light beam overcomes the problems inherent in dual deflector systems including the need for increased numbers of parts that are required for the dual light paths and the resulting inherent errors in such dual system.

What is claimed is:
1. An optic system, comprising:
   a source of a coherent, plane polarized, first light beam that is directed along a first optic axis;

beam splitter means, quarter wave plate means and deflector means, all aligned along said first optic axis;
   said quarter wave plate means converting said plane polarized first light beam to a circularly polarized second light beam that is directed along said first optic axis and normally incident upon said deflector means;
   said deflector means formed of a thin ferromagnetic film having a plurality of parallel stripe domains therein for forming a diffraction grating and directing said second light beam along a second optic axis different than said optic axis;
   target means oriented along said second optic axis for intercepting said second light beam and reflecting said second light beam back along said second optic axis and upon said deflector means as a circularly polarized third light beam, the rotation direction of which is reversely rotated with respect to that of said second light beam;
   said deflector means directing said third light beam back along said first optic axis and upon said quarter wave plate means and said beam splitter means;
   said quarter wave plate reconverting said circularly polarized third light beam back to a linearly polarized fourth light beam the plane of polarization of which is rotated 90° with respect to that of said first light beam and which is directed upon said beam splitter means;
   detector means;
   said beam splitter means deflecting said fourth light beam out of said first optic axis and upon said detector means; and,
   control means coupled to said detector means and the source of said first light beam for determining the time of transmission between said deflector means and said target means.

2. An optic system, comprising:
   a source of a coherent, plane polarized, first light beam that is directed along a first optic axis;
   beam splitter means, quarter wave plate means and deflector means, all aligned along said first optic axis;
   said quarter wave plate means converting said plane polarized first light beam to a circularly polarized second light beam that is directed along said first optic axis and normally incident upon said deflector means;
   said deflector means formed of a thin ferromagnetic film having a plurality of parallel stripe domains therein for forming a diffraction grating and directing said second light beam along a second optic axis different than said first optic axis;
   target means oriented along said second optic axis for intercepting said second light beam and reflecting said second light beam back along said second optic axis and upon said deflector means as a reversely rotated circularly polarized third light beam whose sense of rotation has been reversed with respect to that of said second light beam;
   said deflector means directing said third light beam back along said first optic axis and upon said quarter wave plate means;
   said quarter wave plate reconverting said third light beam back to a linearly polarized fourth light beam, the plane of polarization of which is rotated 90° with respect to said first light beam;
   detector means;
   said beam splitter means deflecting said fourth light beam out of said first optic axis and upon said detector means; and,
   control means coupled to said detector means and the source of said first light beam for determining the time of transmission between said deflector means and said target means.

3. An optic system, comprising:
   a source of a coherent, plane polarized, first light beam including beam splitter means, said first light beam being directed along a first optic axis;
   quarter wave plate means and deflector means aligned along said first optic axis for converting said plane polarized first light beam to a circularly polarized second light beam and directing said second light beam along a second optic axis, different than said first optic axis;
   target means oriented along said second optic axis for intercepting said second light beam and reflecting said second light beam back along said second optic axis and upon said deflector means as a reversely rotated circularly polarized third light beam, the sense of rotation of which has been reversely rotated with respect to that of said second light beam;
   said deflector means directing said third light beam back along said first optic axis and upon said quarter wave plate means;
   said quarter wave plate reconverting said circularly polarized third light beam back to a linearly polarized fourth light beam, the plane of polarization of which is rotated 90° with respect to that of said first light beam and that is directed upon said beam splitter means;
   detector means; and,
   said beam splitter means deflecting said fourth light beam out of said first optic axis and upon said detector means.

4. An optic system, compromising:
   a source of a coherent, plane polarized, first light beam that is directed along a first optic axis;
   quarter wave plate means and deflector means, all aligned along said first optic axis, for converting said plane polarized first light beam to a circularly polarized second light beam and directing said second light beam along a second optic axis, different than said first optic axis;
   target means oriented along said second optic axis for intercepting said second light beam and reflecting said second light beam back along said second optic axis and upon said deflector means as a reversely rotated circularly polarized third light beam, the sense of rotation of which has been reversely rotated with respect to that of said second light beam;
   said deflector means directing said third light beam back along said first optic axis and upon said quarter wave plate means, said quarter wave plate means reconverting said circularly polarized third light beam back to a linearly polarized fourth light beam, the plane of polarization of which is rotated 90° with respect to that of said first light beam.

5. The optic system of claim 1, 2, 3 or 4 in which said second optic axis is directed by said deflector means along two orthogonal axes throughout an optical cone whose major axis is normal to the plane of said deflector means.

6. The optic system of claim 5 in which said optical cone major axis is also said first optic axis.

7. The optic system of claims 3 or 4, in which said deflector means is formed of a thin ferromagnetic film having a plurality of parallel stripe domains therein for forming a diffraction grating.

* * * * *